United States Patent Office 3,541,099
Patented Nov. 17, 1970

3,541,099
NITRO-ACRIDONE DYESTUFFS
Kurt E. Burdeska and Hans Bosshard, Basel, and André Pugin, Riehen, Switzerland, assignors to J. R. Geigy A.G., Basel, Switzerland
No Drawing. Continuation of application Ser. No. 609,347, Jan. 16, 1967. This application Mar. 20, 1969, Ser. No. 812,953
Claims priority, application Switzerland, Jan. 21, 1966, 849/66
Int. Cl. C07d 37/30
U.S. Cl. 260—279
9 Claims

ABSTRACT OF THE DISCLOSURE

Acridone dyestuffs bearing at the acridone nucleus in 1-position an organically substituted mercapto group and in 4-position $NO_2$ of which those free from acidically water-dissociable solubilizing groups are suitable for the dyeing of hydrophobic synthetic organic fiber materials, especially textile materials consisting of high molecular organic esters, of synthetic polyamide or of polyolefin fibers, for the dyeing or pigmenting of lacquers, oils and waxes and of cellulose derivatives in the mass; while acid addition salts of the above defined acridone dyestuffs with strong inorganic or organic acids are suitable for dyeing acrylic fibers, and those containing solubilizing groups are useful for dyeing or printing natural or synthetic polyamide fibers from an acid to neutral bath.

---

This invention relates to new nitro-acridone dyestuffs, and to the production thereof. These new dyes are useful for the dyeing of organic material, those of the said dyes which are difficultly soluble in water being particularly useful for the dyeing of hydrophobic organic fibers in aqueous finely dispersed suspensions.

This is a streamlined continuation application of copending application Ser. No. 609,347, filed Jan. 16, 1967.

More particularly, the invention provides for novel nitro-acridone dyestuffs which are obtained by condensing an acridone compound of the formula

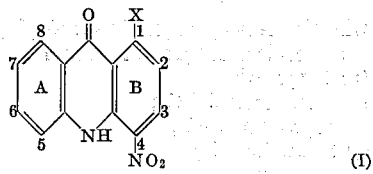

(I)

wherein X represents a mobile substituent which makes nucleophilic substitution possible, and wherein the rings A and B can be further substituted and can be condensed with other rings, with a mercapto compound of the formula

HS—R     (II)

wherein R represents an optionally substituted aliphatic, cycloaliphatic, carbocyclic-aromatic or heterocyclic radical, the condensation optionally being performed in the presence of an acid binding agent, or condensing such acridone compound of Formula I with a metal salt of a mercapto compound of Formula II, and which novel dyestuffs are of the formula

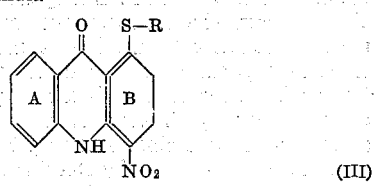

(III)

wherein A, B and R have the meanings given in Formulae I and II.

The compounds according to the invention containing no solubilizing substituents which dissociate acid in water and which form water soluble anions such as sulphonic acid, carboxylic acid or phosphoric acid groups, are especially valuable as dispersion dyestuffs.

In Formula I, X preferably represents halogen such as fluorine, chlorine or bromine. It can also represent, however, the nitro group or a lower alkoxy group such as the methoxy or ethoxy group.

Aliphatic radicals symbolised by R are, e.g. straight or branched chain alkyl or alkenyl groups having up to 18, preferably alkyl of up to 12 carbon atoms, which groups can be substituted. As substituents, these aliphatic radicals can contain e.g. the hydroxyl group, lower alkoxy groups, mononuclear aryloxy groups such as the phenoxy, lower alkylphenoxy or halogenophenoxy group, acyl groups such as preferably lower alkanoyl, carbalkoxy, alkoxycarbalkoxy or carbocycloalkoxy groups, acyloxy groups such as alkoxy-carbonyloxy groups or tosyloxy groups, amino groups, particularly tertiary amino groups such as di-lower alkylamino groups, acylamino groups such as lower alkanoylamino or mononuclear aroylamino, especially benzoylamino groups, also carbocyclic-aromatic radicals, e.g. unsubstituted or substituted phenyl, or 1- or 2-naphthyl radicals, or heterocyclic groups, e.g. the 2-thienyl, 2-furyl or 2-tetrahydrofuryl radical.

Cycloaliphatic groups symbolised by R are, e.g. cycloalkyl groups, preferably 5- or 6-membered rings and, especially, the cyclohexyl group.

When R is a carbocyclic-aromatic radical, then this radical belongs to, e.g. the naphthalene series, preferably however, the benzene series; it can contain the usual ring substituents. Heterocyclic radicals symbolised by R can be of aromatic and also non-aromatic character; aromatic-heterocyclic radicals are preferably 5- or 6-membered and can contain one sole hetero atom or several identical or different hetero atoms; they can also be fused, e.g. with a benzo radical. Examples are triazolyl, tetrazyl, 2- or 4-pyridyl, 2-quinolinyl, 1,3,5-triazinyl, 2-benzoxazolyl, 2-benzothiazolyl radicals which can contain the usual ring substituents. Preferred non-aromatic-heterocyclic radicals are also 5- or 6-membered; examples are the 2-thiazolinyl, the 2-imidazolinyl, the 2-(6-methylpenthiazolinyl) radical.

All carbocyclic-aromatic rings of the nitro acridone dyestuff of Formula III can contain the substituents usual in dyestuffs, e.g. halogens such as fluorine, chlorine or bromine; alkyl groups, preferably alkyl groups having up to 4 carbon atoms, also however, alkyl groups having up to 20 carbon atoms; mononuclear aryl groups such as the phenyl or p-methylphenyl group; alkoxy groups such as the methoxy or ethoxy group; alkylthio groups such as the methylthio or ethylthio group; mononuclear aryloxy or arylthio groups such as the phenoxy or phenylthio group; acyl groups, e.g. hydrocarbon sulphonyl groups such as lower alkylsulphonyl or phenylsulphonyl groups, also lower carbalkoxy groups; carboxylic or sulphonic acid groups; carboxylic or sulphonic acid amide groups derived from ammonia or primary or secondary organic amines such as carboxylic or sulphonic acid-N-mono- or -N,N-di- lower alkylamide groups; primary, secondary and tertiary amino groups, the preferred substituents in secondary and tertiary amino groups being lower alkyl groups; acylamino groups, especially lower alkanoylamino, e.g. acetylamino groups, or mononuclear aroylamino groups, e.g. benzoylamino or benzene di(carbonylamino) groups, and, further, the nitro, cyano or trifluoromethyl group.

Advantageously, the ring A is not substituted or it contains a lower alkyl group such as the methyl or ethyl group, or an alkoxy group such as the methoxy or ethoxy group, or halogen such as chlorine or bromine. The ring B can contain, above all, a halogen such as chlorine or bromine, especially in the 2-position, as substituent. Preferably, the ring B is unsubstituted.

When the rings A and B are further condensed then they contain preferably benzo radicals. For example, the ring A can contain a benzo radical in 7,8-position.

When primary amino groups are present in the end product of Formula III, these can still be acylated. Reactive functional derivatives, e.g. of fatty acids such as acetic acid, or of mononuclear aromatic mono- or dicarboxylic acids such as benzoic acid or of a benzene dicarboxylic acid can be used as acylating agents.

In this specification and the appended claims, the term "lower" applied to "alkyl" and "alkoxy" means such groups having 1 to 5 carbon atoms, and applied to "alkanoyl" and "alkoxycarbonyl" it means such groups having 2 to 5 carbon atoms, unless expressly stated otherwise.

The new nitro dyestuffs of the acridone series which do not contain any water solubilising groups which dissociate acid in water are suitable for the dyeing of hydrophobic synthetic organic fibre material, e.g. for the dyeing of textile material consisting of high molecular organic esters such as cellulose di- or tri-acetate. They are particularly suitable however, for the dyeing of textile material made from polymeric esters of aromatic polycarboxylic acids with polyvalent alcohols, especially from polyethylene glycol terephthalate or polycyclohexane diol terephthalate. These dyestuffs however, can also be used for the dyeing of synthetic polyamide fibres such as polyhexamethylene adipinamide, polycaprolactam or polyamino undecanoic acid, or for the dyeing of polyolefines, especially of polypropylene fibres. In addition, depending on their composition, they are suitable for the dyeing or pigmenting of lacquers, oils and waxes as well as of cellulose derivatives, particularly cellulose esters such as cellulose acetate in the mass, as many of the nitroacridone dyestuffs according to the invention are soluble in some of the usual organic solvents, e.g. in acetone or methyl ethyl ketone.

The fibre materials mentioned are preferably dyed from an aqueous dispersion of the nitroacridone dyestuffs according to the invention which are difficultly water soluble. It is thus of advantage to finely distribute end products of Formula III which can be used as dispersion dyestuffs by milling with dispersing agents and, possibly, other milling auxiliaries.

Anionic dispersing agents suitable therefor are, e.g. the alkylaryl sulphonates, condensation products of formaldehyde with naphthalene sulphonic acid, lignin sulphonates; suitable non-ionogenic dispersing agents are the fatty alcohol or alkyl phenol polyglycol ethers having a higher alkyl radical.

The dyeing of polyester fibres with the difficultly water soluble dyestuffs according to the invention from an aqueous dispersion is performed by the processes usual for polyester materials. Polyesters of aromatic polycarboxylic acids with polyvalent alcohols are preferably dyed at temperatures of over 100° C. under pressure. The dyeing can also be performed, however, at the boiling point of the dyebath in the presence of carriers, e.g. alkali metal phenyl phenolates, polychlorobenzene compounds or similar auxiliaries, or by the pad dyeing process in the foulard followed by a hot treatment, e.g. thermofixing, at 180–210° C. Cellulose diacetate fibres are preferably dyed at temperatures of 80–85° C. whilst cellulose triacetate fibres and synthetic polyamide fibres are advantageously dyed at the boiling point of the dyebath. The use of carriers is not necessary for the dyeing of the latter types of fibres. Nitro acridone dyestuffs according to the invention can also be used for printing the materials mentioned by the usual methods.

The end products of Formula III which can be used as dispersion dyestuffs draw very well onto the hydrophobic organic fibre material mentioned above, particularly onto polyethylene glycol terephthalate fibres and, on this fibre material, produce strong yellow to orange dyeings which have very good fastness to light, washing, milling, rubbing, perspiration, sublimation, solvents and decatising. In addition, in organic solvents, e.g. dimethyl formamide, they have a high molar extinction. Another advantage of the new nitroacridone dyestuffs is that they can be combined well with blue anthraquinone dyestuffs.

Of special interest because of their good dyeing properties and accessibility are those dyestuffs falling under Formula III in which R is selected from the class consisting of
(a) unsubstituted phenyl,
(b) phenyl substituted by at least one of the following substituents: alkyl of at most 12 carbon atoms, lower alkoxy, chlorine, bromine, nitro, trifluoromethyl, lower alkylsulfonyl, lower alkoxycarbonyl, carbamyl, lower alkylcarbamyl or an amino group of the formula

wherein
$R_1$ is hydrogen, lower alkyl or lower alkanoyl and
$R_2$ is hydrogen or lower alkyl;
(c) naphthyl;
(d) alkyl of at most 18 carbon atoms;
(e) cyclohexyl;
(f) lower alkyl substituted by a substituent selected from among: lower alkanoyloxy, benzoyloxy, alkoxycarbonyl of a total of from 2 to 19 carbon atoms, phenoxycarbonyl, cyclohexyloxycarbonyl, alkoxy-alkoxycarbonyl of a total from 3 to 10 carbon atoms, lower alkoxycarbonyloxy, hydroxy, lower alkoxy, phenoxy or an amino group of the formula

wherein $R_3$ is hydrogen, lower alkyl, phenyl or cyclohexyl and $R_4$ is hydrogen or lower alkyl;
(g) C-pyridyl;
(h) benzothiazolyl-(2);
(i) benzoxazolyl-(2);
(j) thiazolinyl-(2);
(k) triazolyl;
(l) tetrazolyl; and
(m) 1,3,5-triazinyl-(2) wherein the 4- and 6-positions are occupied by substituents selected from among hydrogen, halogen, amino, lower alkylamino and lower alkoxy;

and wherein ring A is unsubstituted or substituted by chlorine, bromine, lower alkyl, lower alkoxy, nitro or amino, and ring B is unsubstituted or substituted in 2-position by chlorine or bromine.

Good disperse dyes for the dyeing of hydrophobic organic and particularly polyester fibers are especially those which are free from solubilizing groups which dissociate acid in water, and among the latter, as a first subclass, those in which R represents unsubstituted phenyl or phenyl substituted by alkyl of at most 4 carbon atoms, lower alkoxy, chlorine, bromine, nitro, trifluoromethyl or lower alkylsulfonyl, and wherein ring A is unsubstituted or substituted by chlorine, bromine, lower alkyl, lower alkoxy, nitro or amino, and ring B is unsubstituted or substituted in 2-position by chlorine or bromine.

End products of Formula III not containing water solubilising groups which dissociate acid, in which R is the phenyl radical or an alkyl, alkoxy or chlorine-substituted phenyl radical, are preferred as dispersion dyestuffs. Such end products are distinguished by great colour strength and affinity to polyester fibre material, particularly to fibres from polymeric esters of aromatic polycarboxylic acids with polyvalent alcohols such as polyethylene glycol terephthalate fibres. In addition, the dyeings attained therewith on this type of fibre are very fast, particularly to light, rubbing, sublimation and washing.

Particularly well suited for the dyeing of polypropylene and Dacron-type polyester fibers are those of the dyestuff of Formula III in which R represents alkylphenyl wherein the alkyl moiety has from 5 to 12 carbon atoms, and wherein ring A is unsubstituted or substituted by chlorine, bromine, lower alkyl or lower alkoxy, and ring B is unsubstituted or substituted in 2-position by chlorine or bromine.

Those water insoluble end products of Formula III in which R is an alkyl radical are also very valuable as they have good stability to acid and alkali.

Dyeings on polyester fibres with this subclass of dyestuffs of Formula III, especially those in which R represents alkyl of up to 18, particularly alkyl of from 2 to 12 carbon atoms, and optimally those of this latter subclass, wherein ring A is unsubstituted or substituted by chlorine, bromine, lower alkyl, lower alkoxy, nitro or amino, and ring B is unsubstituted or substituted in 2-position by chlorine or bromine, are distinguished by superior light fastness, fastness to sublimation, and colour depth from other acridones not substituted in 1- and 4-position concurrently.

In the form of salts of a strong inorganic or organic acid, dyestuffs of Formula III according to the invention which contain groups which make them basic, generally dissolve well in water. They draw from an aqueous, neutral or—advantageously—also weakly acid liquor, optionally in the presence of wetting agents such as addition products of alkylene oxides and higher alcohols, onto polymeric or copolymeric acrylonitrile fibres on heating in an open or closed vessel under pressure. On this material they produce yellow to orange dyeings which are fast, in particular, to washing, decatising and light.

The new nitroacridone dyestuffs of Formula III which contain groups which dissociate acid in water, e.g. sulphonic acid groups, can be used for the dyeing and printing of natural or synthetic polyamide fibres from an acid to neutral bath.

Starting materials of Formula I wherein X represents chlorine, fluorine or bromine can be produced, e.g. by condensation of an optionally further substituted aminobenzene compound of the formula

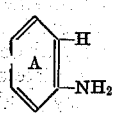

with a 2,6-dichloro-, 2,6-difluoro- or 2,6-dibromo-3-nitrobenzene carboxylic acid of the formula

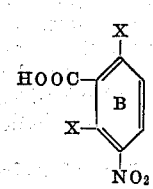

and subsequent ring closure according to K Lehmstedt and K. Schrader [compare in Berichte der deutschen Chemischen Gesellschaft, vol. 70, 1526–38 (1937)], or they can be produced by condensation of an optionally further substituted aminobenzene carboxylic acid of the formula

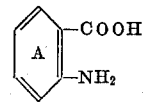

with a 1,3-dichloro-, 1,3-difluoro- or 1,3-dibromo-4-nitrobenzene compound of formula

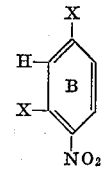

and subsequent ring closure according to H. B. Nisbet [compare in Journal of the Chem. Soc. (London) 1933, 1372–73].

In the latter case the optionally further substituted aminobenzene-carboxylic acid can also be condensed with 1-chloro- or 1-bromo-3,4-dinitrobenzene compounds, advantageously in the presence of alcohols, ketones, cyclic ethers, optionally halogenated or nitrated aromatic hydrocarbons or optionally halogenated aliphatic hydrocarbons.

The reaction of the acridone compound of Formula I with the mercapto compound of Formula II is performed, e.g. in the melt in an excess of mercapto compound or, preferably, in aqueous, organic or organic-aqueous solution or dispersion. Suitable organic solvents are, e.g. aromatic hydrocarbons such as toluene or xylenes, aromatic halogen hydrocarbons such as chlorobenzene, aliphatic ketones such as methyl ethyl ketone or methyl isobutyl ketone, cyclic ethers, e.g. dioxane, amides of lower fatty acids, particularly dimethyl formamide, or dialkyl sulphoxides such as dimethyl sulphoxide. The use of an alkali metal salt, particularly the sodium or potassium salt of the mercapto compound of Formula II as starting material is recommended or the addition of agents having an alkaline reaction to the reaction mixture is recommended such agents being, in particular, alkali metal carbonates such as sodium or potassium carbonate, or alkali metal hydroxides, preferably sodium or potassium hydroxide, also however, magnesium oxide or tertiary nitrogen bases such as pyridine. In dimethyl sulphoxide, the reaction takes place even at room temperature; in all other solvents, a higher temperature of, e.g. 80–140° C. is indicated.

A modification of the process according to the invention for the production of nitro acridone dyestuffs of Formula III consists in reacting an acridone compound of Formula IV

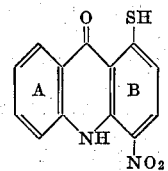

wherein the remarks given for A and B in Formula I pertain, with a compound of Formula V $$Z—R \qquad (V)$$

wherein Z represents a substituent which can be split off as anion, and R has the meaning given in Formula II.

Z in Formula V preferably represents halogen such as fluorine, chlorine, bromine or iodine; it can also represent, however, a sulphated hydroxyl group or an ester thereof such as an alkyl ester such as the methyl or ethyl ester, or an arylsulphonyloxy group, e.g. the phenylsulphonyloxy or p - methylphenylsulphonyloxy group.

Examples of compounds of Formula V are: alkyl, alkenyl, aralkyl chlorides, bromides or iodides, 2- or 4-nitro- or 2,4-dinitro-1-chlorobenzenes or 1-bromobenzenes, dimethyl or diethyl sulphate, benzene sulphonic acid methyl or ethyl ester or p-toluene sulphonic acid methyl or ethyl ester, heterocycles containing mobile substituents, particularly mobile halogen, preferably nitrogen heterocycles such as 2-chloro- or 2-bromo-1,3,5-triazines which can be further substituted in the 4- and 6-position, for example which can contain alkyl, aryl, alkoxy or amino groups or halogens.

Starting materials of Formula IV are obtained, e.g. by reacting acridone compounds of Formula I wherein X represents chlorine, fluorine or bromine, with alkali metal sulphides such as sodium sulphide in molar ratio of 1:1, or reacting such acridone compounds with alkali metal hydrogen sulphides such as sodium hydrogen sulphide.

The reaction partners, i.e. a mercapto compound of Formula IV and a compound of Formula V are reacted, e.g. direct in the presence of acid binding agents or in aqueous or in aqueous-organic solution or dispersion, the organic moiety of which advantageously consists of water miscible organic solvents, particularly alcohols such as methanol or ethanol, aliphatic ketones, preferably acetone, cyclic ethers such as dioxane, or amides of fatty acids such as dimethyl formamide, or aliphatic sulphoxides such as dimethyl sulphoxide. Examples of acid binding agents are alkali metal carbonates or hydroxides or tertiary nitrogen bases such as pyridine. However, such acid binding agents need not be used if an alkali metal salt, e.g. the sodium or potassium salt of a 1-mercapto-4-nitro-acridone of Formula IV is used as starting material.

A second modification of the process according to the invention for the production of nitro acridone dyestuffs of Formula III consists in reacting a compound of Formula VI

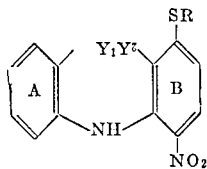

(VI)

wherein one of $Y_1$ and $Y_2$ represents hydrogen and the other the carboxyl group or a reactive functional derivative thereof, e.g. a halide such as a chloride or bromide, or an ester, e.g. a lower alkyl ester, the reaction being performed under cyclising conditions, optionally in the presence of an acid condensing agent. Compounds of Formula VI wherein $Y_1$ is the carboxyl group and $Y_2$ is hydrogen are preferred for preparative reasons.

Starting materials of Formula VI wherein $Y_1$ is the carboxyl group and $Y_2$ is hydrogen are obtained, e.g. by condensation of an optionally further substituted aminobenzene carboxylic acid of the formula

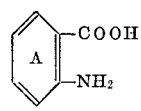

with a benzene compound of the formula

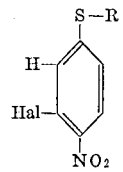

wherein Hal represents chlorine or bromine, the condensation being performed by known methods [cf. H. B. Nisbet, Journal of the Chem. Soc. (London) 1933, 137–73].

Starting materials of Formula VI wherein $Y_2$ is the carboxyl group and $Y_1$ is hydrogen can be produced, e.g. by condensing an optionally further substituted aromatic amine of the formula

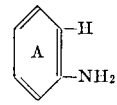

with a 2,6-dichloro- or 2.6-dibromo- 3-nitrobenzene carboxylic acid according to K. Lehmstedt and K. Schrader [Berichte der deutschen Chemischen Gesellschaft vol. 70, 1526–38 (1937)] and then exchanging the chlorine or bromine atom which still remains for the group —S–R.

The ring of the compound of Formula VI is closed to form the end product of Formula III in the known way, advantageously by heating and in the presence of an acid condensing agent. Preferred acid condensing agents are phosphoric oxychloride, polyphosphoric acids, possibly also sulphuric acid. Further details regarding this reaction are given in "The Chemistry of Heterocyclic Compounds, Acridines" by R. M. Acheson, p. 105–117 (1956).

The following non-limitative examples illustrate the invention further. The temperatures are given therein in degrees centigrade. Percentages are by weight unless expressly stated otherwise.

EXAMPLE 1

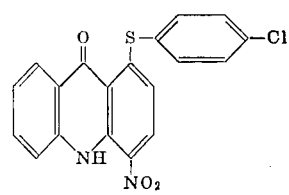

12 g. of anhydrous potassium carbonate are added to a dispersion of 41.2 g. of finely pulverised 1-chloro-4-nitro-acridone (M.P. 250–251°) and 24.9 g. of 4-chlorothiophenol in 300 ml. of dimethyl sulphoxide, the addition being made at room temperature (20°) while stirring well. The temperature rises to 45°. The yellow slurry which forms after a short time is slowly heated to 90–95° and stirred for 1 hour at this temperature. The mixture is then cooled to 50° and 1500 ml. of water are added. The precipitated yellow reaction product is stirred for another 20 minutes and then filtered off. It is washed with hot water and then dried. The yield is 57.4 g.

After milling with the sodium salt of the condensation products of naphthalene-2-sulphonic acid and formaldehyde, the nitro dyestuff obtained of the above formula dyes polyethylene glycol terephthalate fibres, in the presence of sodium-o-phenyl phenolate as carrier, in greenish yellow shades which have very good fastness to washing, rubbing, light and sublimation.

The nitroacridone dyestuff of the above formula is also obtained if, with otherwise the same procedure, instead of the 41.2 g. of 1-chloro-4-nitro-acridone, 47.9 g. of 1-bromo-4-nitro-acridone (M.P. 252–254°) is used. The bromine compound is obtained by condensing 1-nitro-2,4-dibromobenzene with the potassium salt of 2-aminobenzene-1-carboxylic acid and closing the ring in the 2-nitro-5-bromodiphenylamine-2'-carboxylic acid (M.P. 240–242°) formed. The cyclisation is performed in sulphuric acid.

If instead of the 24.9 g. of 4-chlorothiophenol, the equimolar amount of one of the mercapto compounds given in column 2 of the following Table I is used and these are reacted as described above with 41.2 g. of 1-chloro-4-nitroacridone or with 47.9 g. of 1-bromo-4-nitro-acridone, then end products are obtained which dye polyethylene glycol terephthalate fibres in the fast shades given in column 3 of this table.

TABLE I

| Number | Mercapto compound | Shade on polyethylene glycol terephthalate fibres |
|---|---|---|
| 2 | $HS-C_2H_5$ | Greenish yellow. |
| 3 | $HS-C_3H_7$ | Do. |
| 4 | $HS-C_8H_{17}$ | Do. |
| 5 | $HS-C_{12}H_{25}$ | Do. |
| 6 | $HS-CH_2-CH_2-OH$ | Yellow. |
| 7 | $HS-CH_2-CH_2-OCH_3$ | Do. |
| 8 | $HS-CH_2-CH_2-OC_2H_5$ | Do. |
| 9 | $HS-CH_2-CH_2-CH_2-OCH_3$ | Do. |
| 10 | $HS-CH_2-CH_2-CH_2-OC_2H_5$ | Do. |
| 11 | $HS-CH_2-CH_2-O-C_6H_5$ | Do. |
| 12 | $HS-CH_2-CH_2-COC_2H_5$ | Do. |
| 13 | $HS-CH_2-COOCH_3$ | Do. |
| 14 | $HS-CH_2-COOC_2H_5$ | Do. |
| 15 | $HS-CH_2-COO-iso-C_8H_{17}$ | Do. |
| 16 | $HS-CH_2-COO-CH(C_2H_5)-(CH_2)_3-CH_3$ | Do. |
| 17 | $HS-CH_2-COO-C_6H_{11}$ | Greenish yellow. |
| 18 | $HS-CH_2-COO-CH_2-CH_2-OCH_3$ | Do. |
| 19 | $HS-CH_2-COO-CH_2-CH_2-CH_2-OCH_3$ | Do. |
| 20 | $HS-CH_2-CH_2-NH_2$ | Yellow. |
| 21 | $HS-CH_2-CH_2-NH-CH_3$ | Do. |
| 22 | $HS-CH_2-CH_2-N(CH_3)_2$ | Do. |
| 23 | $HS-CH_2-CH_2-N(C_2H_5)(CH_2C_6H_5)$ | Do. |
| 24 | $HS-CH_2-C_4H_3O$ (furyl) | Greenish yellow. |
| 25 | $HS-CH_2-CH(CH_2)_2O(CH_2)$ | Do. |
| 26 | $HS-C_6H_{11}$ | Do. |
| 27 | $HS-CH_2-C_6H_5$ | Do. |
| 28 | $HS-CH_2-C_6H_4-Cl$ | Do. |
| 29 | $HS-CH_2-C_6H_3(Cl)_2$ | Do. |
| 30 | $HS-CH_2-C_6H_4-CH_3$ | Do. |
| 31 | $HS-CH_2-C_6H_4-OCH_3$ | Do. |
| 32 | $HS-CH_2-C_6H_4-Br$ | Yellow. |
| 33 | $HS-C_6H_4-Br$ | Do. |
| 34 | $HS-C_6H_3(Cl)_2$ | Do. |
| 35 | $HS-C_6H_2(Cl)_3$ | Do. |

3,541,099

TABLE I—Continued

| Number: | Mercapto compound | Shade on polyethylene glycol terephthalate fibres |
|---|---|---|
| 36 | HS—⌬(Cl)—NO₂ | Reddish yellow. |
| 37 | HS—⌬(OCH₃)(Cl) | Do. |
| 38 | HS—⌬(CH₃)(Cl) | Yellow. |
| 39 | HS—⌬(CF₃) | Do. |
| 40 | HS—⌬—CH₃ | Greenish yellow. |
| 41 | HS—⌬(CH₃)—CH₃ | Yellow. |
| 42 | HS—⌬—OCH₃ | Do. |
| 43 | HS—⌬—OC₂H₅ | Do. |
| 44 | HS—⌬—CH(CH₃)₂ | Reddish yellow. |
| 45 | HS—⌬—C(CH₃)₃ | Do. |
| 46 | HS—⌬—C₉H₁₉ | Greenish yellow |
| 47 | HS—⌬—C₁₂H₂₅ | Do. |
| 48 | HS—⌬—SO₂CH₃ | Do. |
| 49 | HS—⌬—SO₂C₃H₇ | Do. |
| 50 | HS—⌬(COOCH₃) | Do. |
| 51 | HS—⌬(COOC₂H₅) | Do. |
| 52 | HS—⌬(CONH₂) | Do. |
| 53 | HS—⌬(CONHCH₃) | Do. |
| 54 | HS—⌬(CON(C₂H₅)₂) | Do. |

TABLE I—Continued

| Number: | Mercapto compound | Shade on polyethylene glycol terephthalate fibres |
|---|---|---|
| 55 | HS—C₆H₄—NH₂ | Yellow. |
| 56 | HS—C₆H₄—NHC₂H₅ | Do. |
| 57 | HS—C₆H₄—N(CH₃)₂ | Do. |
| 58 | HS—C₆H₄—NHCOCH₃ | Do. |
| 59 | HS—C₆H₃(OCH₃)—NHCOCH₃ | Do. |
| 60 | HS—C₆H₄—CN | Do. |
| 61 | HS—naphthyl | Do. |
| 62 | HS—pyridyl (3-) | Greenish yellow. |
| 63 | HS—pyridyl (2-) | Do. |
| 64 | HS—C(benzothiazole) | Yellow. |
| 65 | HS—C(benzoxazole) | Do. |
| 66 | HS—C(S—CH₂, N—CH₂) | Do. |
| 67 | HS—C—N(phenyl), N=CH, N | Greenish yellow. |
| 68 | HS—C—N(phenyl), N=N, N | Do. |
| 68a | HS—CH₂—COO—(CH₂)₁₇—CH₃ | Yellow. |
| 68b | HS—CH₂—CO—O—C₆H₅ | Do. |
| 68c | HS—(CH₂)₅—OCH₃ | Do. |
| 68d | HS—(CH₂)₃—CH₃ | Greenish yellow. |
| 68e | HS—(CH₂)₄—CH₃ | Do. |
| 68f | HS—CH₂CH₂—CH—(CH₃)₂ | Do. |
| 68g | HS—(CH₂)₆—CH₃ | Do. |
| 68h | HS—(CH₂)₇—CH₃ | Do. |
| 68i | HS—C₆H₄—CH₃ | Yellow. |

TABLE I—Continued

| Number: | Mercapto compound | Shade on polyethylene glycol terephthalate fibres |
|---|---|---|
| 68j | HS—C₆H₃(CH₃) (2-methylphenyl) | Do. |
| 68k | HS—C₆H₃(CH₃)₂ (2,4-dimethylphenyl) | Do. |
| 68l | HS—C₆H₃(CH₃)₂ (2,6-dimethylphenyl) | Do. |
| 68m | HS—C₆H₃(CH₃)(C(CH₃)₃) (2-methyl-4-tert-butylphenyl) | Do. |
| 68n | HS—C₆H₄—CH(CH₃)₂ (isopropylphenyl) | Do. |
| 68o | HS—CH₂—(naphthyl) | Do. |
| 68p | HS—CH₂—CH₂—N(CH₃)—COCH₃ | Do. |
| 68q | HS—CH₂—CH₂—NH—C₆H₅ | Do. |
| 68r | HS—CH₂—CH₂—NH—CO—C₆H₅ | Do. |
| 68s | HS—CH₂—CH₂—NH—C₆H₁₁ | Do. |
| 68t | HS—CH(CH₃)—CH₂—CH₃ | Do. |
| 68u | HS—C(CH₃)₃ | Do. |

EXAMPLE 69

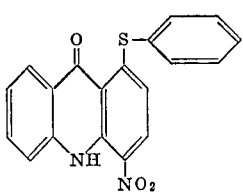

40 g. of thiophenol and 4 g. of a 50% aqueous potassium hydroxide solution are heated to 60°. 8.24 g. of 1-chloro-4-nitro-acridone are added to the solution while stirring and then the mixture is heated for 10 minutes at 110–115°. On cooling to 100°, the yellow suspension is stirred into a 60° warm solution of 16 g. of sodium hydroxide in 500 ml. of water. The precipitated yellow nitro dyestuff of the above formula is stirred for another 20 minutes at 60–70° and then filtered off. It is washed free of alkali with hot water and then dried. The yield is 11 g.

After milling with the sodium salt of a condensation product of naphthalene-2-sulphonic acid with formaldehyde, the dyestuff obtained in this example dyes polyethylene glycol terephthalate fibres, in the presence of sodium-o-phenyl phenolate, in greenish yellow shades which have very good fastness to washing, rubbing, light and sublimation.

EXAMPLE 70

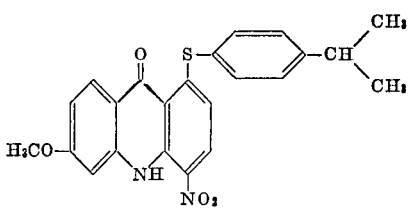

6.1 g. of 1-chloro-4-nitro-7-methoxy-acridone (produced by condensation of 4-methoxy aniline with 2,6-dichloro-3-nitrobenzene-1-carboxylic acid and subsequent ring closure by methods known per se; M.P. 261–262°), 3.64 g. of 4-isopropyl-thiophenol and 2 g. of anhydrous potassium carbonate in 150 ml. of methylisobutyl ketone are refluxed for 4 hours. The methylisobutyl ketone is then distilled off with steam and the precipitated orange-red product is filtered off, washed with hot water and then dried. The yield is 8.5 g.

By repeating Example 70, but using in lieu of 4-isopropyl-thiophenol equivalent amounts of the mercaptane used in Examples 2–43 or 45 to 68 μ, or thiophenol, respectively, the corresponding 7-methoxy-acridones are obtained.

These dyestuffs dye polyethylene glycol terephthalate fibres from an aqueous dispersion in the presence of sodium-o-phenyl phenolate, in reddish yellow shades which have very good fastness to washing, rubbing, light and sublimation.

Reddish yellow dyestuffs having similar good dyeing properties are also obtained if, with the same procedure, the 6.1 g. of 1-chloro-4-nitro-7-methoxy-acridone are replaced by 6.4 g. of 1-chloro-4-nitro-7-ethoxy-acridone (M.P. 241–243°) or by 6.4 g. of 1-chloro-4-nitro-7-methylmercapto-acridone (M.P. 256–258°), or by 7.32 g. of 1-chloro-4-nitro-7-phenoxy-acridone (M.P. 218–219°).

By repeating Example 70, but using in lieu of isopropyl thiophenol an equivalent amount of 4-nonyl thiophenol, the corresponding acridone is obtained which dyes the aforesaid polyester fibres and also polypropylene fibres reddish-yellow shades of the above-mentioned fastness properties.

EXAMPLE 71

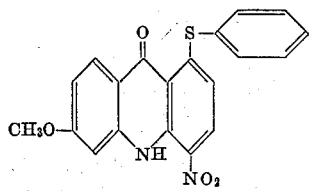

6.1 g. of 1-chloro-4-nitro-6-methoxy-acridone (produced by condensation of 3-methoxy aniline with 2,6-dichloro-3-nitrobenzene-1-carboxylic acid and ring closure in phosphorus oxychloride; M.P. 251–252°), 2.64 g. of thiophenol and 2 g. of anhydrous potassium carbonate in 100 ml. of dimethyl sulphoxide are heated for 30 minutes at 90–95°. After cooling to room temperature, 500 ml. of water are added to the dispersion and the precipitated yellow reaction product is filtered off. It is washed with hot water and dried. The yield is 7.5 g. of nitro dyestuff.

If the 1-chloro-4-nitro-6-methoxy-acridone is replaced by the same amount of 1-chloro-4-nitro-5-methoxy-acridone (produced by condensation of 2-methoxy aniline with 2,6-dichloro-3-nitrobenzene-1-carboxylic acid and subsequent ring closure by the usual methods; M.P. 316–318°), and otherwise the procedure given in this example is followed, then a yellow nitro dyestuff is also obtained.

Two parts by weight of each of the dyestuffs so obtained are brought into a finely dispersible form by milling with 6 parts by weight of a lignin sulphonate. On using these dye preparations in aqueous dispersion in the presence of sodium-o-phenyl phenolate, polyglycol terephthalate fibres are dyed in yellow shades. The dyeings have very good light, washing, rubbing and sublimation fastness.

EXAMPLE 72

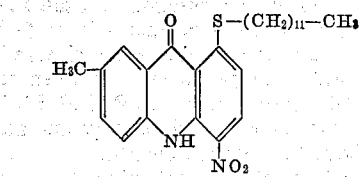

5.8 g. of 1-chloro-4-nitro-7-methyl-acridone are suspended in the solution of 4.44 g. of n-dodecyl mercaptan and 90 ml. of dimethyl formamide, and 2 g. of anhydrous potassium carbonate are added at room temperature while stirring. The suspension is then heated for 1½ hours at 110°. After cooling to room temperature, the reaction mixture is diluted with 500 ml. of water, the suspension is stirred for another 20 minutes and then the precipitated orange-yellow reaction product is filtered off. It is washed with water and dried. The yield is 9 g. of nitroacridone dyestuff of the above formula. 1-chloro-4-nitro-7-methyl-acridone can be produced as follows:

12.1 g. of 5-methyl-2-aminobenzene-1 - carboxylic acid are heated to 70–80° with 325 ml. of amyl alcohol, and at this temperature 12.1 g. of anhydrous potassium carbonate are added during 10 minutes. Then the resulting mixture is heated to the boil and 50 ml. of amyl alcohol are distilled off. After cooling to 60°, 17.8 g. of 1,2-dinitro-4-chlorobenzene are added and the whole is again heated to the boil. Thereby a red solution is obtained from which the red potassium salt of 2-nitro-5-chlorodiphenyl-4'-methyl-2-carboxylic acid precipitates. The red suspension obtained which can easily be stirred, is heated to the boil overnight. Then it is cooled to room temperature and the precipitated potassium salt is filtered off. The residue is suspended in 300 ml. of water and acidified with 40 ml. of 15% hydrochloric acid. After the addition of 6 g. of sulphaminic acid, the amyl alcohol still present is distilled off with steam. The resulting yellow product is filtered off while still hot, washed with water and dried. Yield: 22.3 g. Melting point 240–241° (from glacial acetic acid). The ring closure to obtain 1-chloro-4-nitro-7-methyl-acridone is effected in the usual way in polyphosphoric acid. Melting point 238–240°.

By repeating Example 72, but using in lieu of dodecyl mercaptan equivalent amounts of the mercaptans used in Examples 1 to 4 and 6 to 68μ, or thiophenol, respectively, the corresponding reddish-yellow 7-methyl acridone dyes falling under Formula III are obtained.

If, instead of the 5.8 g. of 1-chloro-4-nitro-7-methyl-acridone, 6.1 g. of 1-chloro-4-nitro-7-ethyl-acridone (M. P. 222–224°) or 6.33 g. of 1-chloro-4-nitro-7-isopropyl-acridone (M.P. 261–263°) are used and otherwise the procedure given in the above example is followed, then orange-yellow dyestuffs are also obtained.

All of these dyestuffs in aqueous dispersion in the presence of sodium-o-phenyl phenolate, dye polyethylene glycol terephthalate fibres in reddish yellow shades which have very good fastness to light, washing, rubbing and sublimation.

By repeating Example 72, but using in lieu of n-dodecyl mercaptan and equivalent amount of 4-nonyl thiophenol, the corresponding acridone is obtained which dyes the aforesaid polyester fibres and also polypropylene fibres reddish-yellow shades of the above-mentioned fastness properties.

EXAMPLE 73

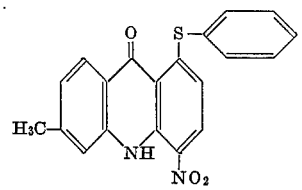

5.8 g. of 1-chloro-4-nitro-6-methyl acridone (produced by condensation of 2-bromo-4-chloro-1-nitrobenzene with the potassium salt of 4-methyl-2-aminobenzene-1-carboxylic acid and subsequent cyclisation in polyphosphoric acid; M.P. 283–284°), 2.42 g. of thiophenol and 1.8 g. of anhydrous potassium carbonate in 90 ml. of dimethyl sulphoxide are heated for 30 minutes at 90–95°. After cooling to room temperature, the yellow suspension is stirred into 500 ml. of water. The precipitated yellow dyestuff is filtered off, washed with water and dried. The yield is 7.5 g. of the nitroacridone dyestuff of the above formula.

If the 5.8 g. of 1-chloro-4-nitro-6-methyl acridone are replaced by 5.8 g. of 1-chloro-4-nitro-8-methyl acridone (produced by condensation of 2-bromo-4-chloro-1-nitrobenzene with the potassium salt of 6-methyl-2-aminobenzene-1-carboxylic acid and subsequent cyclisation in polyphosphoric acid; M.P. 216°), then, with otherwise the same procedure, a yellow dyestuff is also obtained.

EXAMPLE 74

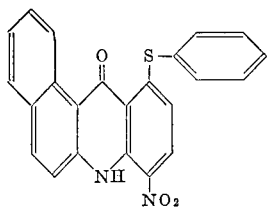

6.48 g. of 1-chloro-4-nitro-7,8-benzacridone (produced by condensation of 2-naphthylamine with 2,6-dichloro-3-nitro-benzene-1-carboxylic acid and ring closure in phosphorous oxychloride (M.P. >330°), 2.64 g. of thiophenol, 1.7 g. of anhydrous potassium carbonate and 150 ml. of dimethyl sulphoxide are heated for 1 hour at 90–95°. After cooling, the yellow suspension is stirred into 500 ml. of water and the mixture is stirred for another 10 minutes. The precipitated yellow dyestuff is filtered off, washed with hot water and then dried. The yield is 7.8 g. of nitroacridone dyestuff of the above formula.

If the 6.48 g. of 1-chloro-4-nitro-7,8-benzacridone are replaced by 6.48 g. of 1-chloro-4-nitro-6,7-benzoacridone (produced by condensation of 1-nitro-2-bromo-4-chloro-benzene with the potassium salt of 2-naphthylamine-3-carboxylic acid and subsequent cyclisation in phosphorus oxychloride, brown-red crystals when recrystallised from o-dichlorobenzene, M.P. 333–335° (with decomposition)), or by 7.0 g. of 1-chloro-4-nitro-7-phenyl acridone (M.P. 258–260°), then with otherwise the same procedure, yellow dyestuffs are also obtained.

By repeating Example 74, but using in lieu of thiophenol and equivalent amount of the mercaptans used in Examples 1 to 68μ, respectively, the corresponding yellow 4-nitro-7,8-benzacridones are obtained.

All of these dyestuffs after milling with the sodium salt of the condensation products of naphthalene-2-sulphonic acid and formaldehyde, dye polyethylene glycol terephthalate fibers in the presence of sodium-o-phenyl phenolate in yellow shades which have very good fastness to light, washing, rubbing and sublimation.

EXAMPLE 75

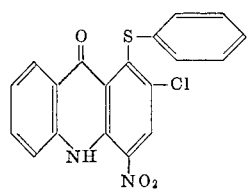

6.2 g. of 1,2-dichloro-4-nitro-acridone (produced by condensation of 1-nitro-4-5,trichlorobenze with the potassium salt of 2-aminobenzene-1-carboxylic acid and subsequent ring closure in phosphorus oxychloride (M.P. 220–221°)), 3.2 g. of potassium thiophenolate and 200 ml. of o-xylene are heated for 5 hours at 135°. The o-xylene is then distilled off with steam and the precipitated orange-red product is filtered off, washed with hot water and dried. The yield is 7.6 g. of the nitro dyestuff of the above formula.

5 parts by weight of this dyestuff are milled with 15 parts by weight of the sodium salts of condensation products of naphthaline-2-sulphonic acid and formaldehyde. This dye preparation, in aqueous dispersion in the presence of sodium-o-phenyl phenolate, dyes polyethylene glycol terephthalate fibres in reddish yellow shades.

By repeating Example 75, but using in lieu of thiophenol an equivalent amount of 4-nonyl thiophenol, the corresponding acridone is obtained which dyes the aforesaid polyester fibres and also polypropylene fibres reddish-yellow shades of the above-mentioned fastness properties.

By repeating Example 75 with 1,2-dibromo-4-nitro-acridone as starting material, the corresponding 2-bromo acridone dyestuffs of similar good dyeing properties are obtained.

EXAMPLE 76

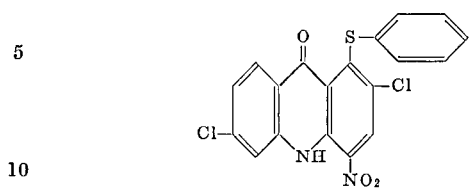

If in Example 75, the 6.2 g. of 1,2-dichloro-4-nitro-acridone are replaced by 6.9 g. of 1,2,6-trichloro-4-nitro-acridone (produced by condensation of 2,4,5-trichloro-1-nitrobenzene with the potassium salt of 2-amino-4-chloro-benzene-1-carboxylic acid and subsequent cyclisation in phosphorus oxychloride, yellow-brown crystals when recrystallised from 1,2-dichlorobenzene, M.P. 287–288°) then, with otherwise the same procedure, a reddish-yellow dyestuff is also obtained.

EXAMPLE 77

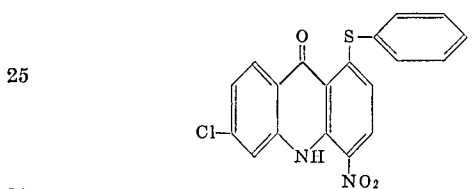

7.1 g. of 1-bromo-4-nitro-6-chloro-acridone (produced by condensation of 1-nitro-2,4-dibromobenzene with the potassium salt of 4-chloro-2-aminobenzene-1-carboxylic acid and subsequent ring closure in phosphorus oxychloride, M.P. 290–292°), or 6.18 g. of 1,6-dichloro-4-nitro-acridone (produced by condensation of 1-nitro-2-bromo-4-chlorobenzene with the potassium salt of 4-chloro-2-aminobenzene-1-carboxylic acid and cyclisation in phosphorus oxychloride, M.P. 257–258°), in 120 ml. of dimethyl sulphoxide are heated for 30 minutes at 90–95° with 2.64 g. of thiophenol and 2 g. of anhydrous potassium carbonate. After adding 500 ml. of water, the whole is cooled to room temperature; the precipitated yellow reaction product is filtered off, washed with water and then dried. The yield is 7.5 g. of yellow nitro dyestuff of the above formula.

EXAMPLE 78

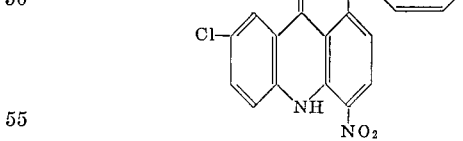

If in Example 77, the 6.18 g. of 1,6-dichloro-4-nitro-acridone are replaced by 6.18 g. of 1,7-dichloro-4-nitro-acridone (produced by condensation of 1-nitro-2-bromo-4-chlorobenzene with the potassium salt of 5-chloro-2-aminobenzene-1-carboxylic acid and ring closure in phosphorus oxychloride, orange-red crystals when recrystallised from 1,2-dichloro-benzene, M.P. 300–301°) then, with otherwise the same procedure, a yellow nitro dyestuff of the above formula is obtained.

By repeating Example 78, but using in lieu of thiophenol an equivalent amount of 4-nonyl thiophenol, the corresponding acridone is obtained which dyes the aforesaid polyester fibres and also polypropylene fibres reddish-yellow shades of the above-mentioned fastness properties.

By repeating Example 78, but using in lieu of thiophenol equivalent amount of the mercaptans employed in Examples 1 to 68u, respectively, the corresponding yellow 7-chloro-acridone dyes falling under Formula III are obtained which possess similar good dyeing properties on polyterephthalate fibres and fastness of the resulting dyeings as the dyestuff of Example 70.

The above dyestuffs falling under Example 78 with an alkylthio group of 5 to 8 carbon atoms also show particularly good reserve of wool.

By using in lieu of 1,7-dichloro-4-nitro acridone an equivalent amount of 1,7-dibromo-4-nitro acridone and otherwise repeating Example 78, with thiophenol or the other thiols employed in Examples 1 to 68u, respectively, there are obtained the corresponding 7-bromo acridone dyestuffs of similar good dyeing and fastness properties.

EXAMPLE 79

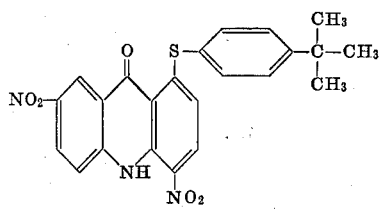

6.4 g. of 1-chloro-4,7-dinitro-acridone [produced according to K. Lehmstedt and K. Schrader, B 70, 1526–1538 (1937)] in 150 ml. of dimethyl sulphoxide are heated for 40 minutes at 90–95° with 4 g. of 4-tert, butyl thiophenol and 2 g. of anhydrous sodium carbonate. After cooling, the suspension is diluted with 500 ml. of water; the yellow product formed is filtered off, washed with water and dried at 80–90°. The yield is 8.8 g. of nitro dyestuff of the above formula.

After milling with the sodium salt of condensation products of naphthalene-2-sulphonic acid with formaldehyde, the dyestuff dyes polyglycol terephthalate fibres in the presence of a carrier in greenish yellow shades. The dyeings have very good fastness to light, washing, rubbing and sublimation.

EXAMPLE 80

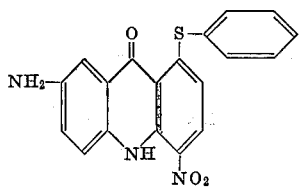

1-chloro-4-nitro-7-amino-acridone is produced by condensation of 4-acetylamino aniline with 2,6-dichloro-3-nitro-benzene-1-carboxylic acid and ring closure with simultaneous hydrolysis of the acetylamino group in sulphuric acid. Recrystallised from o-dichlorobenzene, it is in the form of brownish violet crystals which melt at 300°. 5.8 g. of this compound are suspended in 120 ml. of dimethyl sulphoxide and 2.64 g. of thiophenol at room temperature and 2 g. of anhydrous sodium carbonate are added. The suspension is then slowly heated to 90–95° and stirred for another hour at this temperature. After cooling to room temperature, the suspension is stirred into 500 ml. of water whereupon the dyestuff completely precipitates. The brownish violet reaction product of the above formula is filtered off and washed with water. It is dried in vacuo at 70–80°. The yield is 7.2 g.

In aqueous dispersion in the presence of sodium-o-phenyl phenolate, this dyestuff dyes polyethylene glycol terephthalate fibres in brown-red shades.

7.26 g. of this dyestuff, 80 ml. of glacial acetic acid and 30 ml. of acetic anhydride are boiled for 2 hours. On cooling, the 1-phenylthio-4-nitro-7-acetylamino-acridone obtained crystallises out in the form of red crystals. These are filtered off, washed with alcohol and then with water and dried.

In aqueous dispersion in the presence of carriers, this dyestuff dyes polyethylene glycol terephthalate fibres in orange-red shades. The dyeings have very good fastness to washing, rubbing, light and sublimation.

EXAMPLE 81

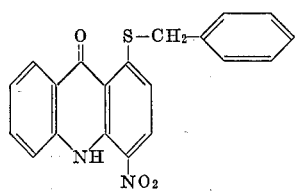

5.5 g. of 1-chloro-4-nitro-acridone are added to a solution of 1.8 g. of sodium sulphide in 120 ml. of ethanol and 30 ml. of water, the addition being made at room temperature while stirring. The reaction mixture is heated to 60–70° while stirring, this temperature is maintained for 10 minutes and then 5 g. of benzyl chloride are added to this mixture. After refluxing for 4 hours, the mixture is allowed to cool and the precipitated crude 1-benzyl-thio-4-nitro-acridone of the above formula is filtered off. After purification by recrystallisation from chlorobenzene, the reaction product is identical with the dyestuff produced according to Example 27.

If in this Example 81, with otherwise the same procedure, instead of the 5 g. of benzyl chloride, the equimolar amount of one of the compounds given in column 2 of the following Table II is used, then dyestuffs are obtained which dye polyethylene glycol terephthalate fibres in the fast shades given in column 3 of this table.

TABLE II

| Example No. | Compound | Shade on polyglycol terephthalate fibres |
|---|---|---|
| 82 | Br—CH₂—⌬ | Greenish yellow. |
| 83 | Cl—CH₂—⌬—Cl | Do. |
| 84 | Cl—CH₂—⌬—Cl (Cl) | Do. |
| 85 | Cl—CH₂—⌬—CH₃ | Do. |
| 86 | Br—CH₂—CH₂—⌬ | Do. |

TABLE II—Continued

| Example No. | Compound | Shade on polyglycol terephthalate fibres |
|---|---|---|
| 87 | I—C₂H₅ | Do. |
| 88 | Br—(CH₂)₄—CH₃ | Do. |
| 89 | Br—CH₂—CH=CH₂ | Do. |
| 90 | Br—CH₂—CH=CH—CH₃ | Do. |
| 91 | Cl—CH₂—CO—CH₃ | Do. |
| 92 | Cl—CH₂—CH₂—OC₂H₅ | Do. |
| 93 | Cl—CH₂—OC₂H₅ | Do. |
| 94 | Cl—CH₂—CH₂—OH | Yellow. |
| 95 | Cl—C(benzothiazole) | Do. |
| 96 | Br—CH₂—CH₂—O—C₆H₅ | Do. |
| 97 | Cl—CH₂—CH(CH₂—O—CH₂) (glycidyl) | Greenish yellow. |
| 98 | Cl—CH₂—C(thiophene) | Do. |
| 99 | Br—CH(CH₃)—C₆H₅ | Yellow. |
| 100 | C₂H₅O—SO₂—OC₂H₅ | Do. |
| 101 | 1-Cl-2,4-dinitrobenzene | Reddish yellow. |
| 102 | 2-OCH₃-4,6-dichloro-1,3,5-triazine | Yellow. |
| 103 | 2-Cl-4,6-bis(diethylamino)-1,3,5-triazine | Do. |
| 104 | 4-Cl-3-nitrobenzenesulfonic acid | Do. |
| 105 | 4-F-3-nitrophenyl methyl sulfone | Do. |
| 106 | 4-F-1,3-dinitrobenzene | Reddish yellow. |
| 107 | methyl 4-F-3-nitrobenzoate | Yellow. |
| 108 | Br—(CH₂)₄—O—C₂H₅ | Yellow. |
| 109 | Br—(CH₂)₃—O—C₁₈H₃₇ | Do. |
| 110 | Br—CH₂—CH₂—O—CO—OC₂H₅ | Do. |
| 111 | Br—CH₂—CH₂—O—SO₂—C₆H₄—CH₃ | Do. |
| 112 | Br—CH₂—CH₂—OCOC₂H₅ | Do. |
| 113 | Br—CH₂—CH₂—O—CO—CH₃ | Do. |

TABLE II—Continued

| Example No. | Compound | Shade on polyglycol terephthalate fibres |
|---|---|---|
| 114 | Br—CH$_2$—CH$_2$—O—CO—⟨⟩ | Do. |
| 115 | Cl—CH$_2$—CH$_2$—O—⟨⟩—CH$_3$ | Do. |
| 116 | Cl—CH$_2$—CH$_2$—O—⟨⟩—Br | Do. |
| 117 | Cl—CH$_2$—CH$_2$—O—⟨⟩—Br | Do. |

EXAMPLE 118

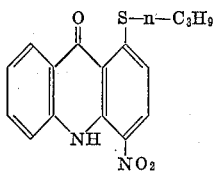

24.9 g. of 2-nitro-5-n-butylmercapto-diphenylamine-2′-carboxylic acid (produced by condensation of 3-chloro-4-nitro-1-n-butylmercaptobenzene with 2-aminobenzene-1-carboxylic acid in the presence of potassium carbonate according to H. H. Hodgson and F. W. Handley, J. Chem. Soc. 1928 (166)) and 110 g. of phosphorus oxychloride are brought to the boil within 20 minutes while stirring well and then kept at the boil for another 30 minutes. After cooling to room temperature, the excess phosphorus oxychloride is decomposed with 1000 g. of ice water. The dispersion formed is heated for 45 minutes at 90–95° and the precipitated product is filtered off hot, washed with hot water and then dried. The yield is 18.5 g. of nitro dyestuff of the above formula.

After milling with the sodium salt of a condensation product of naphthalene-2-sulphonic acid and formaldehyde, the dyestuff obtained in this example dyes polyethylene glycol terephthalate fibres, in the presence of sodium-o-phenyl phenolate, in greenish yellow shades.

EXAMPLE 119

24.9 g. of 2-nitro-5-n-butylmercapto-diphenylamine-6-carboxylic acid (produced by condensation of 2-nitro-5-chloro-diphenylamine-6-carboxylic acid with n-butylmercaptan in the presence of potassium carbonate) are added to 210 g. of concentrated sulphuric acid and the whole is heated for 2 hours at 90–95° while stirring. After cooling, the solution formed is added dropwise to 1500 g. of ice water. The precipitated yellow product is filtered off and washed free of acid. To purify, it is slurried in 500 ml. of water, 5 g. of sodium carbonate are added and the whole is heated for 45 minutes at 50°. The dyestuff is then filtered off, washed with water and dried. The yield is 17.8 g.

The dyestuff obtained is identical with the product produced according to Example 118.

EXAMPLE 120

2 g. of the dyestuff obtained according to Example 69 are dispersed in 4000 g. of water. 12 g. of sodium salt of p-phenyl phenol are added to this dispersion as carrier and also 12 g. of diammonium sulphate and then 100 g. of polyethylene glycol terephthalate yarn are dyed for 1½ hours at 95–98°. The dyeing is rinsed with water and then after treated with dilute aqueous sodium hydroxide solution and a dispersing agent, such as a mixture from octylphenyl-polyglycol ether and coconut-oil fatty acid-N,N-bis-(β-hydroxyethyl)-amide. In this way a greenish yellow dyeing is obtained which is fast to washing, light and sublimation.

If in this example, 100 g. of polyethylene glycol terephthalate yarn are replaced by 100 g. of cellulose triacetate fabric, dyeing is performed under the conditions given and then the dyeing is rinsed with water, then a greenish yellow dyeing is obtained which has very good fastness to washing and sublimation.

EXAMPLE 121

2 g. of the dyestuff obtained according to Example 72 are finely dispersed in 2000 g. of water containing 4 g. of oleyl polyglycol ether, in an apparatus for dyeing under pressure. The pH of the dyebath is adjusted to 6–6.5 with acetic acid.

100 g. of polyethylene glycol terphethalate fabric are introduced at 50°, the bath is heated to 130° within 30 minutes and the fabric is dyed for 50 minutes at this temperature. The dyeing is then rinsed with water, soaped and dried. Under these conditions a reddish yellow dyeing is obtained which is fast to washing perspiration, light and sublimation.

The dyestuffs described in the other examples produce dyeings of equal quality in this process.

EXAMPLE 122

Polyethylene glycol terephthalate fabric (such as "Dacron," registered trademark of E. I. du Pont de Nemours, Wilmington, Del., USA) is impregnated in a foulard at 40° with a liquor of the following composition:

20 g. of the dyestuff according to Example 1, finely dispersed in
7.5 g. of sodium alginate
20 g. of triethalolamine
20 g. of octylphenol polyglycol ether and
900 g. of water.

The fabric, centrifuged to a content of about 100% (calculated on the dry weight) is dried at 100° and the dyeing is then fixed for 30 seconds at a temperature of 210°. The dyed goods are rinsed with water, soaped and dried. Under these conditions a greenish yellow dyeing is obtained which is fast to washing, rubbing, light and sublimation.

EXAMPLE 123

0.5 g. of the basic dyestuff obtained according to Example 22 are slurried with 0.5 g. of 80% acetic acid and dissolved by the addition of 4000 g. of hot water. One further gram of 80% acetic acid, 2 g. of sodium acetate and 4 g. of an addition product of 15 mols of ethylene oxide to olein alcohol are added to this solution and 100 g. of polyacrylonitrile fibres are introduced into the bath. The bath is heated to 90° within 30 minutes, kept at this temperature for 10 minutes and then dyeing is performed at the boil for 1 hour. The dyebath is almost completely exhausted. The dyed goods so treated are then soaped for 15 minutes at 80° in 5000 g. of water with the addition of 6 g. of sodium salt of oleic acid-N-methyl-N-β-sulphonic acid ethylamide, then rinsed and dried. The polyacrylonitrile fibres are dyed in pure yellow shades which have excellent fastness to washing and decatising.

EXAMPLE 124

0.8 g. of the finely dispersed dyestuff obtained according to Example 46 are added to 2500 g. of water containing 1.5 g. of oleyl polyglycol ether and 1.5 g. of ammonium sulphate. 100 g. of polypropylene yarn (such as "Polycrest" SDR-1, registered trademark of U.S. Rubber Company) are introduced into the dyebath at 50°, the bath is heated to 100° within 30 minutes and dyeing is performed for 1 hour at this temperature. The yarn is then rinsed with hot water and dried. A strongly yellow coloured dyeing is obtained which has very good fastness to light and also good fastness to washing and industrial fumes.

We claim:
1. A compound of the formula

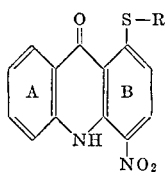

wherein ring A is unsubstituted or monosubstituted by chlorine, bromine, lower alkyl, lower alkoxy, phenoxy, nitro or amino and concurrently wherein any substituent in the 2-position of ring B is selected from hydrogen, chlorine or bromine, or wherein ring A has a benzene ring fused thereto in the 6,7 or 7,8 position and ring B is concurrently not further substituted; and wherein R is selected from the class consisting of
  (a) phenyl,
  (b) phenyl mono or disubstituted by the following substituents: alkyl of at most 12 carbon atoms, lower alkoxy, nitro, cyano, trifluoro-methyl, lower alkylsulfonyl, lower alkoxy-carbonyl, carbamyl, lower alkyl-carbamyl or an amino group of the formula

wherein $R_1$ is hydrogen, lower alkyl or lower alkanoyl, and $R_2$ is hydrogen or lower alkyl plus chloro up to penta chloro and bromo up to penta bromo; and
  (c) naphthyl.

2. A compound as defined in claim 1, wherein R is phenyl or a substituted phenyl in which wherein the substituent is selected from alkyl of at most 4 carbon atoms, lower alkoxy, chlorine, bromine, nitro, trifluoromethyl, or lower alkylsulfonyl; or naphthyl.

3. A compound as defined in claim 2, wherein R is phenyl and each of rings A and B is unsubstituted.

4. A compound as defined in claim 2, wherein R is 4'-chlorophenyl or 4'-isopropylphenyl and each of rings A and B is unsubstituted.

5. A compound as defined in claim 2, wherein R is phenyl, ring A is substituted by chlorine in 7-position and ring B is unsubstituted.

6. A compound as defined in claim 2, wherein R is phenyl, ring A is substituted by methyl in 6- or 7-position and ring B is unsubstituted.

7. A compound as defined in claim 1, wherein R is alkylphenyl wherein the "alkyl" moiety has from 5 to 12 carbon atoms.

8. A compound as defined in claim 7, wherein R is nonylphenyl and each of rings A and B is unsubstituted.

9. A compound as defined in claim 1, wherein R is a phenyl group substituted by an amino group of the formula

wherein $R_1$ is hydrogen, lower alkyl or lower alkanoyl and $R_2$ is hydrogen or lower alkyl, ring A is unsubstituted or substituted by chlorine, bromine, lower alkyl or lower alkoxy, and ring B is unsubstituted, or wherein R is a phenyl group substituted by lower alkoxycarbonyl, carbamyl, lower alkyl-carbamyl or cyano, ring A is unsubstituted or substituted by chlorine, bromine, lower alkyl or lower alkoxy, and ring B is unsubstituted.

References Cited
UNITED STATES PATENTS

| | | | |
|---|---|---|---|
| 2,938,905 | 5/1960 | Slinger | 260—279 |
| 3,054,792 | 9/1962 | Howard et al. | 260—279 X |
| 3,188,164 | 6/1965 | Dehn et al. | 260—279 X |

DONALD G. DAUS, Primary Examiner

U.S. Cl. X.R.

8—40, 54.2, 55; 106—288; 260—248, 249.8, 283, 294.8, 304, 306, 307, 308, 332.5, 347.2, 465.1, 468, 481, 505, 515, 518, 558, 578, 583, 609, 612, 614, 646